US007987058B1

United States Patent
Weber, Jr. et al.

(10) Patent No.: US 7,987,058 B1
(45) Date of Patent: Jul. 26, 2011

(54) SELF-LEARNING REVERSE POWER FLOW DETECTION

(75) Inventors: John Robert Weber, Jr., Northport, NY (US); Carl Francis Scheuermann, Stony Brook, NY (US)

(73) Assignee: DGI Creations, LLC, Raleigh, NC (US)

( * ) Notice: Subject to any disclaimer, the term of this patent is extended or adjusted under 35 U.S.C. 154(b) by 441 days.

(21) Appl. No.: 12/267,024

(22) Filed: Nov. 7, 2008

(51) Int. Cl.
*G01R 25/00* (2006.01)
*H02J 1/00* (2006.01)
*G05F 1/00* (2006.01)

(52) U.S. Cl. .............................. 702/65; 363/65; 323/284
(58) Field of Classification Search .................... 702/64, 702/65; 363/16, 21.02, 65; 709/223; 323/284
See application file for complete search history.

(56) References Cited

U.S. PATENT DOCUMENTS

| | | | | |
|---|---|---|---|---|
| 6,909,266 B2 * | 6/2005 | Kernahan et al. | ............ | 323/282 |
| 7,117,282 B1 | 10/2006 | Weber, Jr. et al. | ............ | 710/107 |
| 7,242,729 B1 | 7/2007 | Heistermann et al. | ........ | 375/329 |
| 7,366,773 B2 | 4/2008 | Weber, Jr. | ............ | 709/223 |
| 7,519,134 B1 | 4/2009 | Heistermann et al. | ........ | 375/329 |
| 2006/0285366 A1* | 12/2006 | Radecker et al. | ............ | 363/16 |
| 2007/0215613 A1* | 9/2007 | Kinzer | ............ | 219/764 |

\* cited by examiner

*Primary Examiner* — Bryan Bui
(74) *Attorney, Agent, or Firm* — The Eclipse Group LLP; Kevin E. Flynn

(57) ABSTRACT

A monitoring device to detect an indication of reverse power flow across a monitored transformer. The monitoring device adapted to handle a series of phase angle differences between a monitored current and a monitored voltage and establish a baseline phase angle difference after the network protector closes to connect the monitored transformer to a distribution network. The monitoring device working to establish a baseline phase angle even when a measured value for the magnitude of the monitored current has a reversed polarity from an actual current flowing from the monitored transformer or when the monitored current and the monitored voltage are not taken from the same phase from the monitored transformer. The monitoring device adapted to detect a significant change in phase angle difference from the baseline phase angle difference as an indication of reverse power flow. This abstract is intended as a tool to help others locate a relevant disclosure and not as a guide to the scope of the claims.

17 Claims, 2 Drawing Sheets

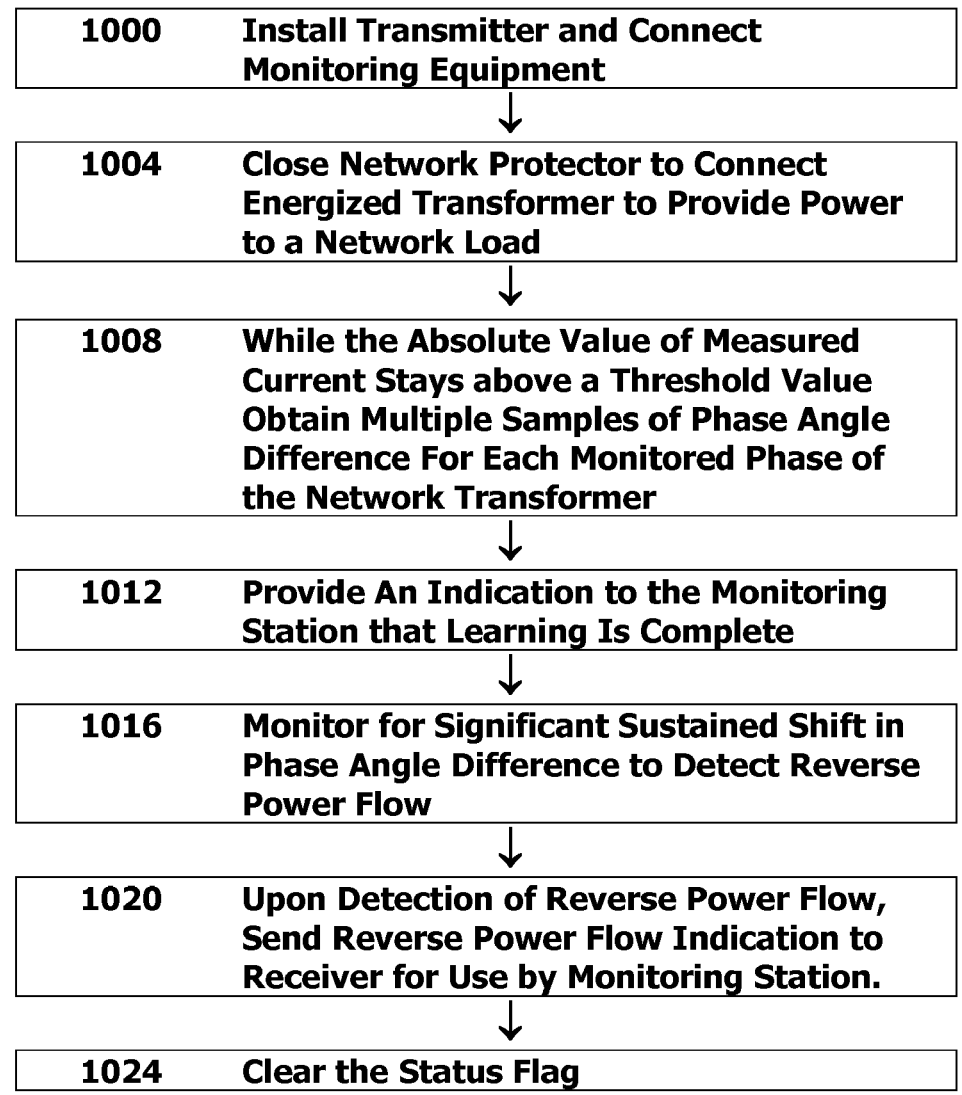

Fig. 2    300

| 1000 | Install Transmitter and Connect Monitoring Equipment |
| --- | --- |
| 1004 | Close Network Protector to Connect Energized Transformer to Provide Power to a Network Load |
| 1008 | While the Absolute Value of Measured Current Stays above a Threshold Value Obtain Multiple Samples of Phase Angle Difference For Each Monitored Phase of the Network Transformer |
| 1012 | Provide An Indication to the Monitoring Station that Learning Is Complete |
| 1016 | Monitor for Significant Sustained Shift in Phase Angle Difference to Detect Reverse Power Flow |
| 1020 | Upon Detection of Reverse Power Flow, Send Reverse Power Flow Indication to Receiver for Use by Monitoring Station. |
| 1024 | Clear the Status Flag |

SELF-LEARNING REVERSE POWER FLOW DETECTION

BACKGROUND

Field of the Invention

This disclosure relates generally to the field of remote monitoring of the conditions of electric power network components, particularly transformers. Parameters and status flags for a transformer may be communicated by anyone of a number of methods such as power line carrier (PLC), which introduces a high frequency analog signal onto a power cable used to convey power in a portion of an electric distribution network. Information about the various transformers in a given electrical distribution network may be aggregated and monitored at a central location. This particular application relates to equipment that may monitor transformers for the undesired condition of reverse power flow and do so in a way that is tolerant of legacy current flow monitoring equipment that may be installed so as to have polarity reversed or to have either the current monitoring equipment or the voltage monitoring equipment connected to the wrong phase of the transformer such that the phase angle difference between the voltage waveform and the current waveform is not in the normal range.

While the present application may be implemented to use any conventional method of conveying information from a remote location to a central location, it will be illustrated in the context of an environment using power line carrier. Power line carrier is used by some information collection systems to send measurements and other information about the operation of a transformer, related equipment, and conditions in the vicinity of the transformer such as in a vault. The information is sent in a data record over one of the three phases of the feeder bus to a centralized location such as a switchyard where the information is pulled from the phase of the feeder bus by a coil or other means and provided to a receiver which also receives information about the operation of other distribution transformers.

Electrical Distribution Network.

FIG. 1 introduces the environment relevant to the present invention. A portion of an electrical distribution network is shown as network 100. Network 100 has feeder bus 104, feeder bus 108, and feeder bus 112. A representative voltage for operation of these feeder buses may be 13 Kv but other systems may operate at 27 Kv, 34 Kv or some other voltage. The power on these three buses is provided to a set of local distribution networks 116 to serve loads 120, 124, and 128. The voltage on these local distribution networks is apt to be 120 volts, but it could be 277 volts, 341 volts or some other voltage. In some cases these loads represent a building or even a portion of a very large building. Depending on the amount of load, the local distribution network may be coupled to one, two, or three feeder buses (104, 108, and 112). Even when the load can consistently be serviced by just one feeder bus, a desire for reliability leads to providing a redundant path for providing service in case of equipment failure, scheduled maintenance, load balancing, or other needs.

The local distribution networks 116 are coupled to the feeder buses 104, 108, and 112 through transformers 150 and related equipment. The transformers convert the relatively higher voltage on the primary side 154 of the transformers 150 to the low voltage on the secondary side 158 of the transformers 150.

The transformers 150 have breakers 162 on the primary side to isolate the transformers 150 from the feeder buses. The transformers 150 have network protectors 166 on the secondary side 158 of the transformers 150 to isolate the transformers 150 from the local distribution networks 116 as needed to protect the transformers from current flowing from the distribution networks (secondary side) to the primary side 154 of the transformers. To have current flowing from the secondary side to the primary side of a transformer is undesirable. This undesirable current flow is known as "back feed" or "reverse power flow". Detecting reverse power flow reliably is the focus of the present application.

Additionally, some networks include sets of fuse links 170 between the network protectors 166 and the local distribution networks 116. Some networks include sets of primary fuse links 174 between the breakers 162 and the feeder buses 104, 108, and 112.

The feeder buses 104, 108, and 112 can be isolated by a set of substation breakers 204 from the transmission network 208 which is ultimately connected to a set of power sources represented here by turbine 212.

Network Protectors and Back Feed.

Electric utilities use network protectors 166 to automatically connect and disconnect the network transformer 150 associated with a particular network protector 166 from the local distribution network 116. Typically, the network protector is set to close when the voltage differential and phase angle are such that the transformer 150 will supply power to the distribution network 116. In other words, the net current flow across the transformer 150 will be from the primary side 154 to the secondary side 158 and towards the loads (such as 120, 124, and 128). Network protectors 166 are supposed to open up (trip) to prevent back feed across a transformer (from secondary side 158 to the primary side 154). As mentioned below, the network protector 166 may have a delay that keeps the network protector 166 from opening during a transient back feed. Typically, the network protector 166 is contained in a submersible enclosure which is bolted to the network transformer and placed with the transformer in an underground vault.

There are many instances of a network protector not being able to open because the trip features of the network protector have been impaired by an electrical or mechanical fault in the network protector. Utilities try to locate and repair network protectors that are not operating correctly to prevent back feed as prolonged back feed can cause network transformer damage from possible extreme differential over voltage (difference between the secondary and primary voltage) during a back feed. Back feed can also impact power quality.

It is not easy for a utility to get crews to all the network protectors as the network protectors may be within customer buildings, on rooftops, accessible only via manholes on busy streets, in vaults that are underwater, or vaults in areas with current construction work.

However, an electric utility would like to know when a network protector fails to open after any prescribed delay period and there is reverse power flow on one or more phases of a monitored transformer. The electric utility understands that a change to reverse power flow will be marked by a change in the phase angle difference between the normal 10 degree voltage sine wave leading current sine wave (often represented by a phase angle of 350 degrees).

Remote Monitoring of Electrical Distribution Network.

FIG. 1 shows a small portion of the network which may have more feeder buses and many more local distribution networks 116 providing power to many more loads. These loads may be distributed around a portion of a city. The various transformers 150 may be in vaults near the various loads. Thus it is convenient to aggregate information about many different transformers at a monitoring station 260. The information about the transformers may be communicated using any known communication media including fiber optic fiber, wired communication including communication routed for at least a portion of the trip over telephone or data communication lines, wireless communication or power line carrier. Power line carrier is a frequent choice as it can be convenient to inject analog signals onto the power lines so that the analog signals can be picked off by pick-up coils 230 at the substation and fed to a receiver 220. While FIG. 1 shows only one transmitter 216, it is understood that a series of transmitters, one for each monitored transformer would be present in an actual network, and the transmitters would communicate through various communication routes possibly including power line carrier to various pick-up coils 230 connected to one or more receivers and the various receivers for a given portion of the distribution network would be in data communication with a monitoring station 260.

The precise way that the analog signals are removed from the power line is not relevant to the scope of the present invention, but one typical means for acquiring the analog carrier signal is through a pick-up coil 230 such as a Rogowski air coil as is known in the art. These analog signals are often in the frequency range of 40 KHz to 70 KHz which is much higher than the frequency of the power being distributed over the network. (For example one common frequency for power grids is 60 Hertz although other frequencies are used throughout the world and can be used in connection with the present disclosure).

While Phase Shift Keying is a known method for increasing the information density in a data transmission, the details of Phase Shift Keying are not relevant to an understanding of the present disclosure.

One suitable location for injecting the analog signal containing information about the operation of a transformer and related equipment is on the secondary side 158 of the transformer between the transformer 150 and the network protector 166. Transmitter 216, is shown in FIG. 1 to illustrate this location but it is understood that each transformer 150 would most likely have its own transmitter. Placement of transmitter 216 in this location allows for the injection of the analog signal onto the relatively low voltage, secondary side of the transformer 150. Traversing the transformer 150 from secondary side 158 to primary side 154 provides only a slight attenuation of the high frequency carrier signal used in power line carrier communication. One data communication path for the power line carrier signal is from transmitter 216 on the secondary side 158 of the transformer 150 to the primary side 154, then through the breaker 162, primary fuse 174, feeder bus 104, pick-up coil 230 and ultimately to receiver 220. This data path is not impacted by the opening of the network protector relay 166 or the relevant fuse 170. The data collected by one or more receivers 220, 222, and 224 may be fed to a monitoring station 260 which allows an operator to see the current state of various components and look at trends and other representations of data over time in order to monitor, manage, and troubleshoot the electrical distribution network.

Commonly assigned U.S. Pat. No. 7,366,773 teaches Alternative Communication Paths for Data Sent Over Power Line Carrier to make it possible for the data to reach the receiver even if one of the components along a primary communication path is open and not conducting data.

Reliance on Legacy Components Not Properly Installed.

Even moderate sized electrical distribution networks are critical infrastructure with thousands of components in hundreds of locations. Large networks can have orders of magnitudes more components and locations. Utility companies try to add new functionalities while minimizing the amount of work to dispatch crews to work on equipment, particularly if the equipment must be de-energized and removed from the network in order to make it safe for the crews to work on the equipment and to move around in close quarters with other equipment such as in an underground transformer vault.

A previous generation of monitoring equipment was tolerant of RMS Current transformers that were installed with incorrect polarity or phasing as the only thing being used from this current transformer was the absolute value of the RMS current flow. (RMS is root mean square). Typically, these RMS Current Transformers were connected to the Network Protector CT transformers that directly measured the current flow on a given phase as an input to the control system for the network protector. The RMS Current Transformers measured the current output of the Network Protector CT Transformers which was indicative of the actual current flow on that phase of the transformer.

Newer feature rich monitoring systems provide additional information to the central monitoring stations. However, one cannot simply assume that a negative current flow number from a legacy RMS current flow device actually indicates reverse power flow as the measuring device may simply be installed with reverse polarity.

SUMMARY

Aspects of the teachings contained within this disclosure are addressed in the claims submitted with this application upon filing. Rather than adding redundant restatements of the contents of the claims, these claims should be considered incorporated by reference into this summary.

This summary is meant to provide an introduction to the concepts that are disclosed within the specification without being an exhaustive list of the many teachings and variations upon those teachings that are provided in the extended discussion within this disclosure. Thus, the contents of this summary should not be used to limit the scope of the claims that follow.

Other systems, methods, features, and advantages of the disclosed teachings will be or will become apparent to one with skill in the art upon examination of the following figures and detailed description. It is intended that all such additional systems, methods, features and advantages be included within the scope of and be protected by the accompanying claims.

BRIEF DESCRIPTION OF THE FIGURES

The disclosure can be better understood with reference to the following figures. The components in the figures are not necessarily to scale, emphasis instead being placed upon illustrating the principles of the disclosure. Moreover, in the figures, like reference numerals designate corresponding parts throughout the different views.

FIG. 2 is a flow chart showing one implementation of a method to use phase angle difference between a current waveform and a voltage waveform to detect the onset of reverse power flow independent of errors in the installation of the monitoring equipment.

DETAILED DESCRIPTION

Figure 1:
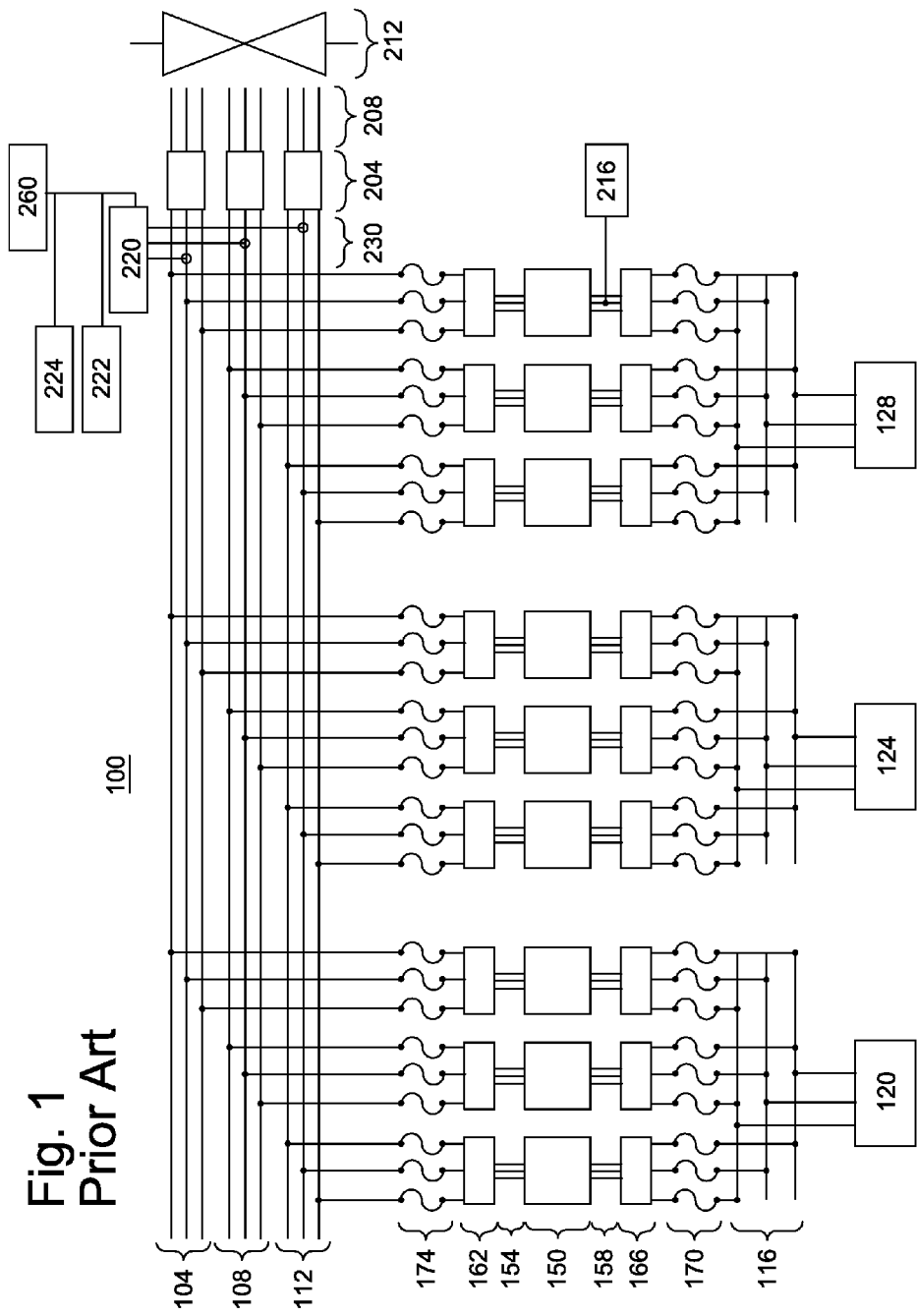
FIG. 1 introduces the relevant components in an electrical distribution network and the devices used to convey information about components to a remote monitoring station.

As the present disclosure monitors for sustained changes in phase angle difference on any monitored phase of a network transformer, it is useful to review the concept of phase angle difference. The addition of inductive or capacitive loads can shift the voltage waveform relative to the current waveform. The voltage waveform leads the current waveform when inductive loads are dominant. Conversely, the voltage waveform lags behind the current waveform when the capacitive load is dominant. The difference between the two waveforms is typically expressed in a phase angle difference. Depending on changes in the mix of proportion of inductive and capacitive loads over time, the phase angle difference may move slightly over time. Typically the network load is predominantly inductive rather than capacitive because of the impact of the many motors connected to the network load and the phase angle difference is that voltage is about 10 degrees ahead of current (often expressed as current ahead of voltage by 350 degrees).

The transmitter 216 shown in FIG. 1 may be configured to perform manipulation of data received from monitoring devices and to transmit derived values in addition to measured values. The transmitters 216 may be configured to determine phase shift of the voltage waveform relative to the current waveform. One of skill in the art will recognize that the manipulation of data could be performed in one device that is in data communication with a device that serves as a transmitter. The division of functionality between two devices local to the monitored transformer is an immaterial change from having the functionality within one device having a transmitter. The term transmitter is intended to extend to cover both a single device and a multi-device configuration.

If one is calculating the phase angle for a given phase of a transformer, there are three possible sources of error. The voltage waveform may be taken from the wrong phase (120 or 240 degrees ahead of the target phase). The current waveform may be from the wrong phase (again perhaps 120 or 240 degrees ahead). Finally, whether the current waveform is coming from the right phase or from one of the two possible wrong phases, the current transformer may be connected backwards (polarity error) which would introduce a 180 shift in phase shift.

So with all of the possible errors in the way the legacy equipment was connected, it is possible to have many different phase angles instead of the normal range around 10 degrees (typically represented as a phase angle difference of 350 degrees) as the various errors will move the phase angle 120 degrees one direction or the other for wrong phase of the bus and having the CT transformer polarity wrong would shift the phase angle approximately 180 degrees. Thus, rather than limiting the range of expected phase angles to a range of about 22 degrees (from about 340 degrees to about 2 degrees (to allow room for instrument errors)), the teachings of the present disclosure are to self-learn a baseline phase angle difference and to accept any baseline phase angle difference as suitable for use in monitoring for a change to reverse power flow.

As noted above, there are a large number of polarity and phasing options for both correct and incorrect installation of the equipment. Each of the incorrect installation combinations will distort the calculation of phase angle. Thus, in networks with large numbers of errors in the installation of legacy equipment, the measured phase angle may not be an accurate representation of the true phase angle difference for a given phase of a given transformer. The present disclosure teaches a way to use these imperfect and unreliable sets of phase angle numbers as a way to discern reverse power flow.

FIG. 2 is a flow chart of process 300 illustrating one implementation of the present disclosure that uses the phase angle for a monitored phase for a new purpose-detecting reverse power flow.

Step 1000 represents the initial activity to install the transformer monitoring transmitter and connect the transmitter to the relevant measuring devices. The connection may be made without testing to ensure that the phasing and polarity of the CT transformer or the phasing of the voltage measurement is accurate.

Step 1004. Eventually the transformer 150 with the transmitter 216 to monitor the transformer 150 and related equipment such as the network protector is put into service and the network protector 166 is closed to allow the transformer to provide power to local distribution network 116 to provide power to a local network load (such as loads 120, 124, or 128). Unlike the legacy CT transformers that provide a current waveform and current flow value to the transmitter which are suspect, it is assumed that the master relay controlling the network protector 166 is reliable and that the master relay has accurate phasing and polarity on the current value used by the master relay to monitor each phase of the transformer. Likewise it is assumed that the master relay has the proper phase associations between the voltage measurements and the phases.

The reason that the master relay for the control of the network protector is assumed reliable while other legacy monitoring devices are not is that there is not any field wiring of the master relay. The network protector is checked carefully at the factory before shipping and is often tested a second time in the customer laboratory before installation to ensure that there are not polarity or phasing errors. In contrast, the CT transformers added in the field to provide inputs to the transformer monitoring systems are field wired while the transformers are isolated and it is easy to miss that a phasing or polarity error has been made.

Thus, when a network protector closes and stays closed it is a fair assumption that there is forward power, no matter what the current level is from the CT transformer providing a current waveform to the transmitter.

If the CT transformers provide an output waveform with an extra phase shift distortion at low absolute current levels, the system may be set to not start taking phase angle measurements until the absolute value of measured current on a particular phase is high enough that the CT transformer low current phase shift error is only a few degrees.

For example, if the CT transformers introduce a phase angle shift of close to 30 degrees for very low current flows, below 75 amps, the system may be set to not start taking measurements until the absolute value of measured current flow exceeds 75 amps on that phase as at 75 amps, the CT transformer induced low current error is only a few degrees. If for some reason the current flow on that phase drops below the threshold (such as 75 amps), the process will start anew once the absolute value for measured current flow climbs above the threshold current.

One of skill in the art will appreciate that the reason that the system looks at whether the absolute value is above the threshold value is that the system seeks to tolerate CT transformers that have poor magnetic core material and thus would never have more accuracy than the threshold value unless the absolute value was used. The absolute value is used rather than the signed value in order to work with current readings that are indicated as negative (falsely) as the CT transformer has reversed polarity.

Step 1008. Collect a series of phase angle difference measurements for each monitored phase of the transformer. After a series of phase angle difference measurements are collected to establish a baseline then the system will be ready to detect a change in the baseline. For example, the period of sampling may be on the order of 50 to 60 seconds to allow for the network values to become stable as various network protectors close to add in a series of transformers.

After the prescribed sampling period has been achieved with absolute current measurements in excess of the threshold value, the average phase angle is stored and the self-learning for that phase of that transformer is complete. If the network protector 166 associated with that transformer opens before the baseline phase angle is determined or the absolute value of the measured current drops below a threshold value then do not indicate via the status flag that the self-learning is complete. Self-learn will restart when the absolute value for the measured current is again above the threshold value.

Step 1012. After getting enough phase angles to establish a baseline, the transmitter will indicate a status flag that learning is complete for that particular phase for that particular transformer. One of skill in the art will appreciate that the transmitter may be equipped with a local communication port so that the transmitter may be placed in communication with a local device such as a laptop computer when the transmitter is being installed or tested. If the crew has the laptop connected to a transmitter when the monitored transformer is passing power through the network protector to a network load, then the indication that the transformer has learned a baseline phase angle difference may be noted to the local laptop so that the crew can confirm that the transmitter as installed can learn a baseline phase angle difference.

Step 1016. Monitor for a significant sustained shift in phase angle to detect reverse power flow. Phase angle will continuously move a small amount as the characteristics of the load change. Large motors will tend to add inductive load. Utilities have capacitor banks that they connect to offset inductive load. As customers are adding and dropping various load sources, the phase angle moves slightly all the time. Thus, detection of reverse power flow requires a significant shift in phase angle. One implementation may use a threshold of a change of plus or minus 90 degrees as this number is large enough that it is not going to be achieved by normal changes in load characteristics. Other implementations could use a smaller threshold or a larger threshold. Thus, "significant" can be much lower than plus or minus 90 degrees as long as the number is larger than any change in phase angle that could be associated with something other a switch to reverse power flow. For example, it is likely that any change in phase angle difference in excess of plus or minus 45 degrees would indicate a switch to reverse power flow but one would need to factor in the errors induced by low current flow on the CT transformers as some of these CT transformers can impose phase distortions of 30 degrees or more at low current flows. A system would want to avoid setting the threshold so low that instrument induced swings in phase angle difference might cause a false indication of reverse power flow.

While one would expect that the phase angle difference between the monitored current and the monitored voltage to move somewhere close to 180 degrees as the current changes direction from forward power to reverse power flow. However, this is often not the case. As back feed is not the intended mode of operation for the transformer, the operation during back feed may be a bit unusual. For instance, the flow of current may not be nearly as balanced over the three phases as it tends to be for a highly loaded transformer passing power in the proper direction. Thus, it may be prudent to monitor all three phases for back feed so that significant current flow on one phase is not missed by monitoring a single phase that does not experience significant current flow.

The back feed currents are apt to be very small compared with the rating of the transformer. Thus, the CT transformers that have significant errors at low current flows may further distort the actual phase angle difference between the monitored current and the monitored voltage. In one set of tests, the phase angle difference shifts were not much more than 86 degrees. Thus, for certain types of distribution networks, it may be prudent to set the "significant" change to down around 85 degrees, 80 degrees or even lower rather than a minimum of 90 degrees. The setting for "significant" needs to be above changes in phase angle difference that could be attributed to some combination of change in load characteristics and instrument induced error that is a function of current flow. On the other hand, the setting for "significant" needs to be low enough that at least one of the three monitored phases reliably exceeds the significant change in phase angle difference whenever there is actual back feed. As in other design decisions, at some point the designer may need to balance the risk of having a false indication of back feed versus the risk of failing to detect back feed and select a setting for "significant" that is influenced by that balance of risks.

Sustained means that the change in phase angle needs to be more than transient. Sustained could be on the order of magnitude of only a few seconds. One implementation reacts when the change in phase angle exceeds 180 seconds (three minutes). Having a delay in responding allows the network protector ample time to open to stop the reverse power flow as the network protector may itself have a time delay to prevent it from reacting to transient conditions. For example, the network protector may have a time delay of 120 seconds before it opens. It would be desirable to have the determination that the delay is "sustained" to use a time period longer than the delay period set within the network protector. If the network protector has not opened after three minutes, it is likely that the network protector is malfunctioning.

In an implementation where the network protector has no requirement for a delay between detecting reverse power flow conditions and opening, the transmitter could use a relatively short period for a "sustained" significant change in phase angle difference.

Step 1020. Upon detection of reverse power flow through the detection of a significant sustained change in phase angle difference from the baseline, then send a Reverse Power Flow Indication to the receiver for use by the monitoring station.

Step 1024. Clearing the Status Flag. The status flag is cleared when the Network Protector is opened manually or automatically by monitoring network protector status flag. A status flag is cleared when the one or more monitored phase returns to normal (forward feeding condition) after 48 minutes.

Different utilities may have different purposes for the Reverse Power Indication flag. Some utilities may prefer for the Reverse Power Indication to stop being sent as soon as the phase angle moves back to the previously learned phase angle for forward power or until the power flow ceases altogether (such as when the network protector or some other breaker opens).

Other utilities may prefer for the Reverse Power Indication flag to stay active for a period of time after phase angle moves back to the previously learned phase angle for forward power so that there is time to locate the source of the problem. As an example, a forty-eight minute delay may be implemented between the end of detecting reverse power and the cessation of the transmittal of the Reverse Power Indication. Some utilities may prefer for the Reverse Power Indication to be removed immediately upon detection that the relevant network protector has opened. However if the cessation of the reverse power flow comes from the changes in network conditions so that the transformer switches to forward power without the network protector ever opening, then the utility may prefer an extended period with the flag for detection of reverse power flow so that the abnormal situation is not missed by the system operators.

Alternatively, the transmitter may detect and note the indication of reverse power flow via the indication flag and clear the flag as soon as conditions indicate a cessation of reverse power flow (often the opening of the network protector). The monitoring station could be the place where the memory of what transmitters have sent indications of reverse power is stored separately from the current status indications for the monitored phases of a monitored transformer.

One of skill in the art will recognize that a transmitter with a self-learn feature as described above may be installed while a feeder is out of service so there is not an easy way to test whether the polarity and phasing of the relevant CT transformers are wired correctly.

One of skill in the art will recognize that some network protectors are wired so that there is apt to be some level of current flow through the network protector even when the network protector is open. Installations using such network protectors will place an emphasis on the network protector status flag. If the network protector status flag switches to open, then the transmitter may be set to flush the previously learned phase angle and will wait for the network protector to close and send enough current so that the absolute value of measured current for a particular phase is above the threshold level.

One of skill in the art will recognize that additional patterns of unusual readings may be used to indicate that something unusual has happened so that the transmitter may flush the learned phase angle measurements and seek to obtain a new series of measurements for use in learning a new phase angle value for each phase.

One of skill in the art will recognize that transmitters may use the teachings of the present disclosure in both single phase and three phase implementations. In a three phase implementation, the transmitter will capture and transmit the Reverse Power Indication flag even if one or two phases have blown fuses as it will send the indication for the one or two phases that are still connected if there is a detected reverse power flow. Note that if there is forward power flow but at an excessive level so that a fuse blows on one of the phases, this will not create a false indication of reverse power flow as there will not be a sustained change in phase angle as there will not be a phase angle to measure once power stops flowing through that phase.

Some legacy instrumentation provides access outside of the sealed network protector to three currents for the three phases but to only one voltage as the individual phase voltages were not monitored. The present disclosure could be used to monitor for reverse power by comparing each of the three currents with the one voltage. This guarantees some phase angle differences that are attributed to using a current from one phase and a voltage from another phase, but the teachings of the present disclosure would overcome that problem.

One of skill in the art will recognize that the establishment of a baseline phase angle for each monitored phase and the detection of a significant sustained change in the phase angle for a given phase which indicates reverse power flow, could be done in the transmitter 216 (FIG. 1) as discussed above but it could be done in the receiver 220 (FIG. 1) or in the central monitoring station 260 (FIG. 1). Thus, when generalized to having a transformer monitor that monitors for a change in phase angle difference from a baseline phase angle difference, the transformer monitor could be the transmitter, the receiver, or the central monitoring station. Note that the transmitter 216 will typically be in the vault with the monitored transformer in proximity to the secondary of the monitored transformer, often mounted outside of the network protector. In contrast, the receiver 220 will be outside the vault and often at a considerable distance from the monitored transformer and connected to a feeder bus operated at the higher primary side voltage as opposed to the transmitter which is typically connected to the secondary side of the monitored transformer.

One of skill in the art will recognize that the manipulations attributed to the receiver could be performed with a device external to the actual receiver but associated with the receiver so that the actual receiver and the associated device work together to perform the tasks ascribed to the receiver in this specification and the claims that follow. The use of two associated devices remote from the monitored transformer to perform the functions of the receiver in lieu of one device is not intended to be a reason by itself to be outside the scope of the claims.

One of skill in the art will recognize that having a transmitter that can detect reverse power flow based on a significant sustained change in phase angle difference between a monitored voltage and a monitored current for a monitored transformer independent of errors in the phase connections or the polarity of the CT transformer, keeps the transmitter generic and allows transmitters to be moved from one location to another without adjusting for the various idiosyncrasies of legacy instruments and wiring errors.

One of skill in the art will recognize that the teachings of the present invention for monitoring a transformer in a vault that is connected to the customer loads could be applied to other transformers in an electrical distribution network, including transformers not in vaults or transformers that feed power to other transformers rather than directly to end user loads.

One of skill in the art will recognize that some of the alternative implementations set forth above are not universally mutually exclusive and that in some cases additional implementations can be created that employ aspects of two or more of the variations described above. Likewise, the present disclosure is not limited to the specific examples or particular embodiments provided to promote understanding of the various teachings of the present disclosure. Moreover, the scope of the claims which follow covers the range of variations, modifications, and substitutes for the components described herein as would be known to those of skill in the art.

In order to promote clarity in the description, common terminology for components is used. The use of a specific term for a component suitable for carrying out some purpose within the disclosed invention should be construed as including all technical equivalents which operate to achieve the same purpose, whether or not the internal operation of the named component and the alternative component use the same principles. The use of such specificity to provide clarity should not be misconstrued as limiting the scope of the disclosure to the named component unless the limitation is made explicit in the description or the claims that follow.

Distribution of Software.

It is also important to note that although the present disclosure has been described in the context of a fully functional monitoring devices, those skilled in the art will appreciate that the mechanisms of the present disclosure are capable of being distributed as a program product or a portion of a suite of programs. This distribution may be done in a variety of forms. The inventiveness of the present disclosure is present in a set of computer instructions adapted to implement some or all of the innovations described above regardless of how this set of instructions is conveyed. A set of computer instructions is a set of instructions adapted for use by a microprocessor in achieving some or all of the advantages set forth above and is distinguishable from a paper such as this disclosure that describes the attributes of an implementation without providing anything that can be processed by microprocessor based components available in 2008 to ultimately be executed by a microprocessor.

One of skill in the art will recognized that the set of computer instructions may be stored on one or more mass storage memory devices that are accessible by a particular device to implement some or all of the innovations described above. The set of computer instructions may be conveyed in one of many types of signal bearing media. Signal bearing media carrying instructions to be executed by one or more computer programming languages may be conveyed in different formats including without limitation program instructions in high level programming languages or in machine code. The signal bearing media may be located on traditional articles of manufacture that are any one of a variety of recordable type media such as floppy disks or compact discs (including write once and re-recordable media). In this instance the recordable type media receives a written set of computer instructions which can subsequently be read by an input device. The recordable type media may then be shipped from one place to another such as shipped to a customer and then the customer may access the computer instructions written into the recordable type media.

A separate category of signal bearing media not currently considered a traditional article of manufacture under the United States patent laws is a paper printout carrying the sequence of computer instructions in at least one computer software language. One of skill in the art will recognize that an appropriate scanner may read paper through such routes as bar code readers, optical character recognition (OCR) of text, or via detection of holes in paper cards or paper tape.

The signal bearing media may be any of the many transmission type media such as analog or digital communications links as the software may be conveyed to a purchaser without the shipment of permanent tangible media but through a transitory propagating signal such as a series of Internet protocol packets.

To the extent that the relevant patent laws allow issuance of claims covering each of these three types of signal bearing media, (recordable media, paper printout, and transmission type media), then it is the intent to include such signal bearing media within the scope of relevant claims.

The legal limitations of the scope of the claimed invention are set forth in the claims that follow and extend to cover their legal equivalents. Those unfamiliar with the legal tests for equivalency should consult a person registered to practice before the patent authority which granted this patent such as the United States Patent and Trademark Office or its counterpart.

What is claimed is:

1. A monitoring device to detect an indication of reverse power flow across a monitored transformer protected by a network protector, the monitoring device adapted to:
    handle a series of phase angle differences between a monitored current and a monitored voltage;
    establish a baseline phase angle difference after the network protector closes to connect the monitored transformer to a distribution network wherein the baseline phase angle difference is established even when a measured value for a magnitude of the monitored current has a reversed polarity from an actual current flowing from the monitored transformer; and
    detect a significant change in phase angle difference from the baseline phase angle difference as an indication of reverse power flow.

2. The monitoring device of claim 1 wherein activity to establish the baseline phase angle difference uses an uninterrupted series of phase angle differences collected after the network protector closes while
    A) the network protector remains closed and
    B) an absolute value of the monitored current remains above a threshold value to reduce measurement error present at absolute values of monitored current below the threshold value.

3. The monitoring device of claim 1 that reports that a significant change in phase angle difference from the baseline phase angle difference has been detected for a particular phase of the monitored transformer.

4. The monitoring device of claim 1 wherein the monitoring device reports the phase angle difference between the monitored current and the monitored voltage to another device.

5. The monitoring device of claim 4 wherein the monitoring device is a transmitter located in proximity to the monitored transformer and transmits the indication of reverse power flow to a receiver remote from the monitored transformer.

6. The monitoring device of claim 1 wherein the monitoring device is a receiver that receives information from a transmitter that is in proximity to the monitored transformer and the transmitter establishes the series of phase angle differences between the monitored current and the monitored voltage.

7. The monitoring device of claim 1 wherein the monitoring device is a monitoring station receiving information from at least one receiver and at least one receiver receiving information from more than one transmitter with each of the more than one transmitter establishing at least one series of phase angle differences between a monitored current and a monitored voltage.

8. The monitoring device of claim 1 wherein the monitoring device will detect a significant difference in phase angle difference as the indication of reverse power flow even when the baseline phase angle difference was established using a monitored current from one phase of the monitored transformer and a monitored voltage from a different phase of the monitored transformer.

9. The monitoring device of claim 1 wherein the monitoring device is adapted to handle three series of phase angle difference, one for each phase of the monitored transformer and the monitoring device can establish a baseline phase angle difference for one phase independently of the other two phases and can detect a significant change in phase angle difference as an indication of reverse power flow even if one or two phases have no current flow.

10. A method for providing an indication of reverse power flow in at least one phase of a monitored transformer protected by a network protector, the method comprising:
    obtaining a series of phase angle differences between a monitored current for a first phase of the monitored transformer and a monitored voltage for a second phase of the monitored transformer;
    setting a baseline value for phase angle differences after sampling a series of phase angle differences collected after the network protector closes but starting the sampling anew if the network protector opens and recloses before the sampling is completed; and detecting a significant change in phase angle difference between the monitored current for the first phase of the monitored transformer and the monitored voltage for the second phase of the monitored transformer and treating the detected significant change as an indication of reverse power flow on a phase of the monitored transformer; the method working to detect a significant change in phase angle difference even when the first phase is not the same as the second phase such that the phase angle difference between the monitored current and the monitored voltage includes a phase angle difference attributed to the use of monitored current for a first phase and a monitored voltage for a phase other than the first phase;

whereby detecting a significant change in phase angle difference between the monitored current for the first phase of the monitored transformer and the monitored voltage for the second phase of the monitored transformer allows for accurate detection of the reverse power flow on a phase of the monitored transformer.

11. The method of claim 10 wherein:

the monitored current is collected by equipment that reverses a polarity of the monitored current to be the opposite of a true current flowing on a phase of the monitored transformer so that the phase angle difference between the monitored current for a first phase and a monitored voltage for a second phase includes a phase angle difference contributed by the reversed polarity of the monitored current; and detecting a significant change in phase angle difference between the monitored current for the first phase of the monitored transformer and the monitored voltage for the second phase of the monitored transformer allows for accurate detection of the reverse power flow on a phase of the monitored transformer.

12. The method of claim 10 wherein setting the baseline value for phase angle differences after sampling a series of phase angle differences collected after the network protector closes starts the sampling anew if an absolute value for current drops below a certain threshold or the network protector opens and recloses before the sampling is completed.

13. The method of claim 10 wherein:

one baseline phase angle difference is established and stored for each of a set of three phases of the monitored transformer; and an indication of reverse power flow will be communicated if any of the three phases of the monitored transformer experiences a significant change in phase angle difference between a monitored pair of a monitored current and a monitored voltage.

14. The method of claim 10 wherein the detection of a significant change in phase angle occurs within a transmitter located in proximity to the monitored transformer and the indication of reverse power flow is communicated from the transmitter to a receiver in data communication with a monitoring station.

15. The method of claim 10 wherein the detection of a significant change in phase angle occurs within a transmitter located in proximity to the monitored transformer and the indication of reverse power flow is communicated from the transmitter onto a secondary phase of the monitored transformer.

16. The method of claim 10 wherein the detection of a significant change in phase angle occurs within a receiver that receives a data transmission from a transmitter located in proximity to the monitored transformer and the indication of reverse power flow is communicated from the receiver to a monitoring station.

17. The method of claim 10 wherein the detection of a significant change in phase angle occurs within a monitoring station that receives a series of phase angle differences from at least two receivers; each receiver in data communication with at least one transmitter located in proximity to the monitored transformer such that one monitoring station may be capable of detecting a significant change in phase angle difference on each of at least two different monitored transformers.

* * * * *